United States Patent
Grattan

(10) Patent No.: US 10,407,012 B2
(45) Date of Patent: Sep. 10, 2019

(54) FRAME PROTRUSION RUPTURE MITIGATING STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

(*) Notice: Subject to any disclaimer, the term of this patent is extended or adjusted under 35 U.S.C. 154(b) by 48 days.

(21) Appl. No.: 15/827,648

(22) Filed: Nov. 30, 2017

(65) Prior Publication Data

US 2019/0161038 A1    May 30, 2019

(51) Int. Cl.
| | |
|---|---|
| *B60N 99/00* | (2006.01) |
| *B60R 19/18* | (2006.01) |
| *B60R 19/36* | (2006.01) |
| *B62D 21/15* | (2006.01) |
| *B62D 25/08* | (2006.01) |

(52) U.S. Cl.
CPC ............ *B60R 19/18* (2013.01); *B60R 19/36* (2013.01); *B62D 21/152* (2013.01); *B62D 25/085* (2013.01); *B60R 2019/1813* (2013.01)

(58) Field of Classification Search
CPC ....... B60R 19/18; B60R 19/36; B60R 21/152; B60R 25/085; B60R 2019/1813
See application file for complete search history.

(56) References Cited

U.S. PATENT DOCUMENTS

| | | | | |
|---|---|---|---|---|
| 4,410,208 | A | * 10/1983 | Mulso, Jr. | ............... B60R 19/34 180/271 |
| 6,174,009 | B1 | * 1/2001 | McKeon | ................. B60R 19/34 188/377 |
| 2014/0361561 | A1 | 12/2014 | Kuriyama et al. | |
| 2018/0194399 | A1 | * 7/2018 | Grattan | ................. B62D 21/152 |
| 2018/0194401 | A1 | * 7/2018 | Grattan | ................. B62D 21/07 |
| 2018/0194402 | A1 | * 7/2018 | Grattan | ................. B62D 21/02 |

FOREIGN PATENT DOCUMENTS

KR    101316876 B1    10/2013

* cited by examiner

*Primary Examiner* — Lori L Lyjak
(74) *Attorney, Agent, or Firm* — Global IP Counselors, LLP

(57) ABSTRACT

An off-center impact structure (a frame protrusion rupture mitigating structure) has a first end section, a mid-section and a second end section. The first end section is fixedly attached to an attachment section of a vehicle front side member. The mid-section extends laterally outward and defines an arcuate shape curving forward from the first end section and laterally outboard. The second end section of the off-center impact structure is located forward of the attachment section. The mid-section has a forward-facing surface formed with a plurality of vertically oriented recesses. In response to an off-center impact event where impacting force is applied to a distal end of the second end section, the off-center impact structure deforms bending along the mid-section with at least a portion of the vertically oriented recesses expanding in a bellows-like manner absorbing impact energy such that the second end section is moved rearward.

17 Claims, 9 Drawing Sheets

FRAME PROTRUSION RUPTURE MITIGATING STRUCTURE

BACKGROUND

Field of the Invention

The present invention generally relates to a vehicle structure. More specifically, the present invention relates to an off-center support structure attached to portions of a vehicle frame, the off-center support structure includes a plurality of recesses that expand in a bellows-like manner in response to impacting forces absorbing portions of the impacting forces. The off-center support structure along with the vehicle frame defines frame protrusion rupture mitigating geometry and frame protrusion rupture mitigating structure.

Background Information

Vehicle structures are routinely being redesigned to include structural features that absorb impact forces in response to impact events.

SUMMARY

One object is to provide an off-center support structure with a plurality of recesses that expand in a bellows-like manner in response to impacting forces absorbing portions of the impacting forces.

In view of the state of the known technology, one aspect of the present disclosure is to provide a frame protrusion rupture mitigating structure with a front side member and an off-center impact structure. The front side member has a front end and a front-section extending rearward from the front end in a vehicle longitudinal direction, the front-section defining an attachment section and a suspension support section rearward of the attachment section. The off-center impact structure has a first end section, a mid-section and a second end section. The first end section is fixedly attached to the attachment section of the front side member. The mid-section extends laterally outward and defines an arcuate shape curving forward from the first end section and to the second end section laterally outboard relative to the front side member. The second end section of the off-center impact structure is located forward of the attachment section of the front side member. The mid-section has a forward-facing surface formed with a plurality of vertically oriented recesses such that in response to an off-center impact event where impacting force is applied to a distal end of the second end section, the off-center impact structure deforms bending at the mid-section with at least a portion of the vertically oriented recesses expanding in a bellows-like manner absorbing impact energy with the second end section moved rearward.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
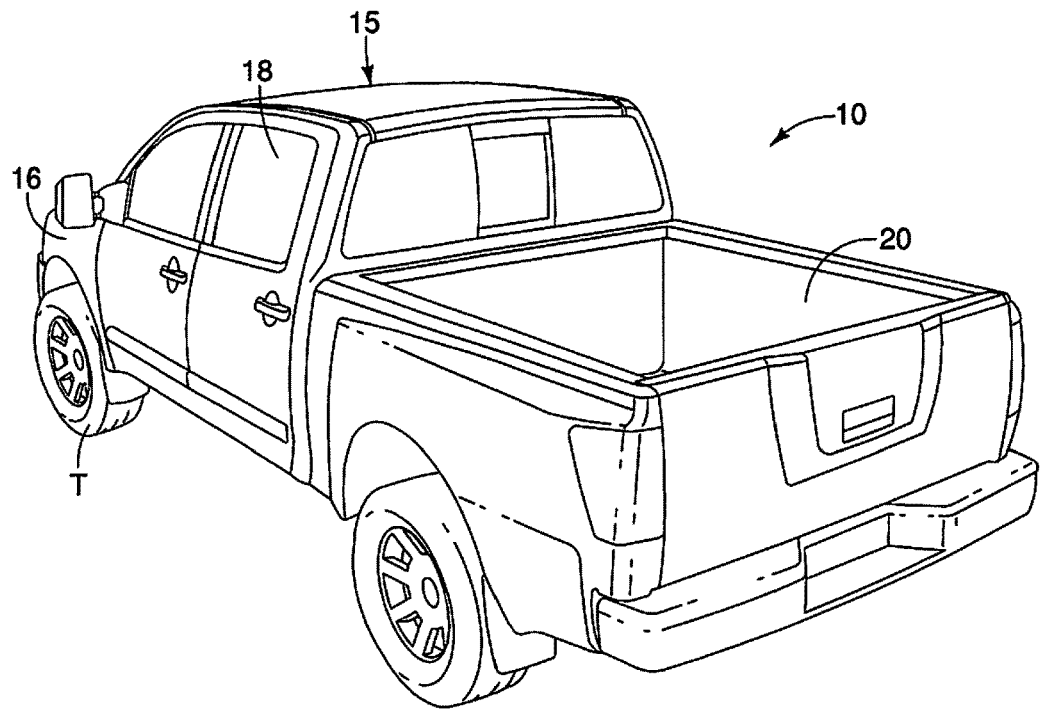
FIG. 1 is a perspective view of a vehicle having an off-center impact structure in accordance with a first embodiment.
Figure 2:
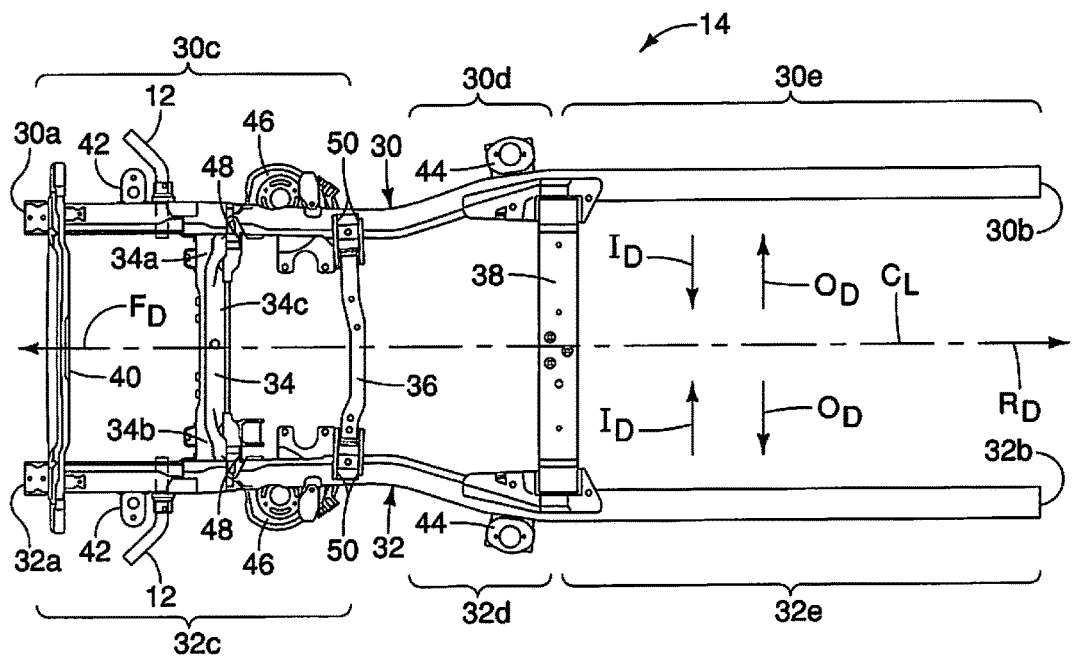
FIG. 2 is a bottom view (looking upward) of a frame from the vehicle depicted in FIG. 1, showing two sets of the off-center impact structures attached to respective front side members at either side of the frame in accordance with the first embodiment.
Figure 3:
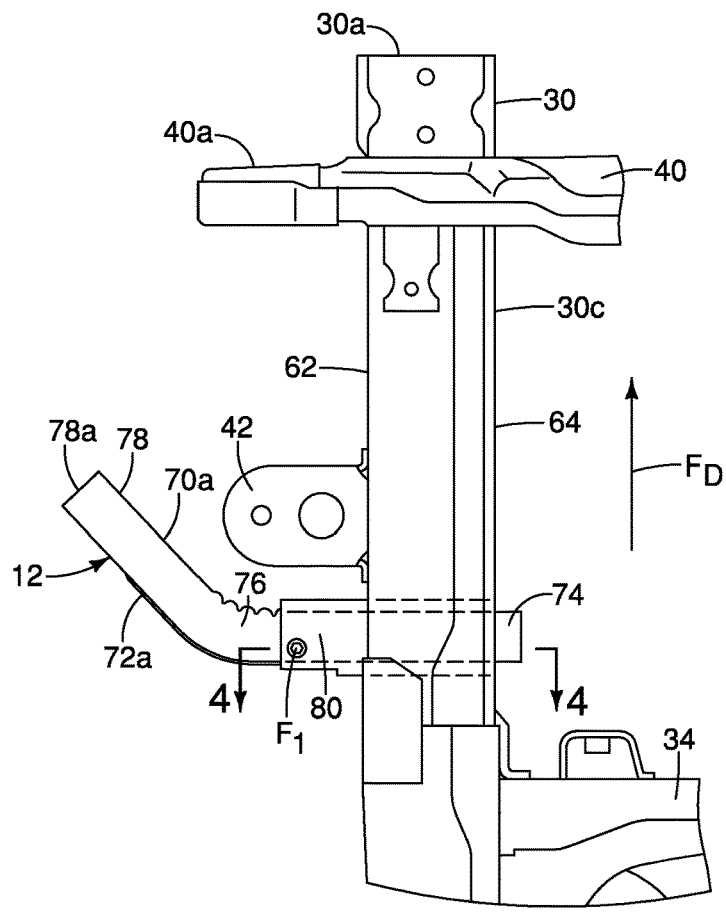
FIG. 3 is a top view (looking downward) of a driver's side portion of the frame depicted in FIG. 2, with the off-center impact structure installed to the frame structure in accordance with the first embodiment.

Referring initially to FIG. 1, a vehicle 10 is illustrated in accordance with a first embodiment. As shown in FIGS. 2 and 3, the vehicle 10 is provided with off-center impact structures 12 that are installed to a frame 14 of the vehicle 10, the off-center impact structures 12 being configured to absorb impact forces during an impact event. The frame 14 of the vehicle 10 is shown removed from the vehicle in FIGS. 2 and 3. The off-center impact structures 12 (with the frame 14) defines a frame protrusion rupture mitigating geometry, also referred to as a frame protrusion rupture mitigating structure.

FIG. 1 shows one embodiment of the vehicle 10. In FIG. 1, the vehicle 10 is depicted as a pickup truck that includes a body structure 15 that defines, for example. an engine compartment 16, a passenger compartment 18 and a cargo area 20. The body structure 15 is installed to and rests on the frame 14. The frame 14 is shown removed from the vehicle 10 in FIGS. 2 and 3. Specifically, FIG. 2 shows the frame 14 with the off-center impact structure 12 installed thereto, and FIG. 3 shows only a front area of the frame 14 with one of the off-center impact structure 12 installed thereto.

In FIG. 1, the depicted pickup truck that defines the vehicle 10 is a heavy-duty vehicle intended to haul large and/or heavy materials. The frame 14 is therefore a rigid, strong structure able to withstand heavy duty usage. However, it should be understood from the drawings and the description herein, that the frame 14 and the off-center impact structure 12 described below can be configured for smaller vehicles or larger vehicles and is not limited to usage in a heavy-duty vehicle such as the vehicle 10. In other words, the off-center impact structure 12 can be used on any size vehicle that includes a frame such as the frame 14 where the body structure 15 attaches to and is supported by the frame 14.

It should also be understood from the drawings and description, that the off-center impact structure 12 can also be employed with a unibody vehicle. A unibody vehicle is a vehicle that does not typically includes a separate frame such as the frame 14. Rather, the unibody vehicle includes various structural elements welded together. Elements of the unibody vehicle serve as frame elements functionally equivalent to the elements of the frame 14. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 14 (described in greater detail below). U.S. Pat. No. 9,180,913, also assigned to Nissan North America, also discloses a unibody vehicle body structure and further discloses an engine cradle. The elements of the off-center impact structure 12 can be installed to portions of the unibody vehicle disclosed in U.S. Pat. No. 8,870,267 and portions of the engine cradle of U.S. Pat. No. 8,870,267. Both U.S. Pat. Nos. 8,870,267 and 9,180,913 are incorporated herein by reference in their entirety. Since unibody vehicles are conventional structures, further description is omitted for the sake of brevity.

The off-center impact structure 12 is shown in FIGS. 2 and 3 installed to specific portions of the frame 14. In FIG. 2 several directions relative to the frame 14 (and the vehicle 10) are shown in order to define orientations of the various features of the vehicle 10 and the off-center impact structure 12. Specifically, the vehicle 10 and the frame 14 define a longitudinal center line $C_L$ that extends in a lengthwise direction of the vehicle 10 along a central portion of the vehicle 10. At a left-hand side of FIG. 2 and right-hand side of FIG. 3, a forward direction $F_D$ is indicated by the depicted arrow. As well, inboard directions $I_D$ and outboard directions $O_D$ relative to the longitudinal center line $C_L$ are also shown in FIG. 2.

As shown in FIG. 2, the frame 14 includes a front side member 30, a second side member 32, a first cross-member 34, a second cross-member 36 and a third cross-member 38 and a front cross-member 40. FIG. 2 shows an underside of the frame 14. In other words, the depiction of the frame 14 is taken from below the frame 14 looking upward. The frame 14 is made of heavy gauge steel, but can alternatively be made of other materials depending upon the overall design of the vehicle 10. It should therefore be understood that the front side member 30 extends along and under a driver's side of the vehicle 10, and the second side member 32 extends along and under a passenger's side of the vehicle 10.

The front side member 30 is an elongated beam (a first side member) that has multiple contours and shapes. Specifically, the front side member 30 has a front end 30a and a rear end 30b. The front side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the front side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first and second side members 30 and 32 each include body attachment flanges 42 and 44 (also referred to as attachment flanges and cab mount flanges). The body attachment structures 42 and 44 are welded to the first and second side members 30 and 32 and are dimensioned and shaped to attach to the vehicle body structure 15 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36.

Although not shown in FIG. 2, the third portions 30e and 32e of the first and second side members 30 and 32 can also include additional body attachment structures configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 2, each of the first portions 30c and 32c of the first and second side members 30 and 32 further include front suspension structures (also referred to as suspension support sections) such as coil spring supports 46, first suspension support sections 48 and second suspension support sections 50.

The engine compartment 16 of the body structure 15 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the body structure 15 are located above the third portions 30e and 32e of the first and second side members 30 and 32.

As shown in FIGS. 2 and 3, the first cross-member 34 is rigidly attached to the front side member 30 and rigidly attached to the second side member 32. The first cross-member 34 can be co-planar with the first and second side members 30 and 32, or can be located above or below the first and second side members 30 and 32. The first cross-member 34 has a first end 34a, a second end 34b and mid-section 34c that extends from the first end 34a to the second end 34b. The first end 34a of the first cross-member is fixed to the front side member 30.

In the depicted embodiment, the first cross-member 34 extends in a vehicle lateral direction from the first portion 30c of the front side member 30 to the first portion 32c of the second side member 30 at a location rearward of the front ends 30a and 32a. The first cross-member 34 is further rigidly fixed to each of the front side member 30 and the second side member 32. As shown in FIGS. 2 and 3, the first cross-member 34 extends perpendicular to the first portion 30c of the front side member 30 and the first portion 32c of the second side member 32.

The second end 34b of the first cross-member 34 is also fixed to the second side member 32 in a manner consistent with the attachment of the first end 34a to the front side member 30. Since the attachment of the second end 34b to the second side member 32 is basically the same as the attachment of the first end 34a to the front side member 30, further description of the attachment of the first cross-member 34 to the second side member 32 is omitted for the sake of brevity.

The second cross-member 36 extends in the vehicle lateral direction and is rigidly fixed to areas of each of the front side member 30 and the second side member 32 rearward of the first cross-member 34. The second cross-member 36 can be welded to each of the first portions 30c and 32c of the first and second side members 30 and 32. However, the second cross-member 36 can be attached to the first and second side members 30 and 32 via mechanical fasteners (not shown).

An engine receiving space is defined in the area confined between the first and second cross-members 30 and 32, and between the first and second side members 34 and 36. An engine or power plant P is installed to the frame 14 in the engine receiving space in a conventional manner. The power plant P (also referred to as a vehicle power plant) can be an electric motor, an electric motor combined with an internal combustion engine (hybrid motor), a gasoline powered internal combustion engine or a diesel powered internal combustion engine. The power plant P has a significant amount of mass (weight) to the overall weight of a vehicle. For example, a power plant for a vehicle can typically constitutes anywhere from 15% to 45% of the overall weight of a vehicle. In the depicted embodiment, the power plant P constitutes approximately 30% of the overall weight of the vehicle 10, with the vehicle 10 in a cargo free and passenger free state.

The third cross-member 38 extends between front ends of each of the third portions 30e and 32e of the first and second side members 30 and 32. The third cross-member 38 is welded to each of the first and second side members 30 and 32 and can serve as an attachment structure for a rear portion of the body structure 15 (at a mid-portion of the passenger compartment 18), and/or can serve as an attachment structure for the structure that defines the cargo area 20.

The front cross-member 40 is welded or otherwise rigidly fixed to the front ends 30a and 32a of the first and second side members 30 and 32. A bumper structure (not shown) can be attached to the front cross-member 40. Alternatively, the bumper structure (not shown) can be attached to the front ends 30a and 32a of the first and second side members 30 and 32 replacing the front cross-member 40.

The front cross member 40 is attached to the front side member 30 at or adjacent to the front end 30a of the front side member 30. The front cross member 40 can optionally include an outboard portion 40a that extends from the front side member 30 forward of the off-center impact structure 12 in the outboard direction $O_D$. In response to an impact event, the outboard portion 40a of the front cross member 40 deforms and can contact a portion of the off-center impact structure 12, as described in greater detail below. However, it should be understood from the drawings and the description herein that the outboard portion 40a is optional and is not required.

As is shown in FIG. 2, the off-center impact structures 12 is installed to the front side member 30 and another one of the off-center impact structures 12 is installed to the front side member 32. The two off-center impact structures 12 are symmetrically arranged relative to the longitudinal center line $C_L$ of the vehicle 10. The two off-center impact structures 12 are structurally, basically identical, except that they are mirror images of one another. Consequently, description of one of the off-center impact structures 12 applies equally to the other. Therefore, only one of the off-center impact structures 12 is described herein below for the sake of brevity.

A description of one of the off-center impact structures 12 is now provided with specific reference to FIGS. 3-16. The off-center impact structure 12 is connected to, supported to and/or directly attached to the front side member 30, as shown in FIGS. 2, 3 and 4.

Figure 4:
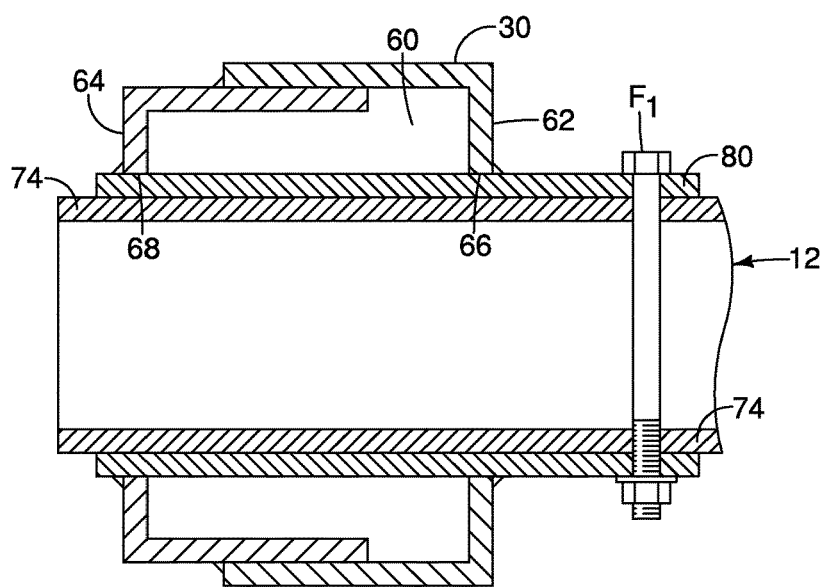
FIG. 4 is a cross-sectional view of the frame and a portion of the off-center impact structure taken along the line 4-4 in FIG. 3, showing details of the off-center impact structure and attachment to the front side member in accordance with the first embodiment.

In the depicted embodiment as shown in FIG. 4, the front side member 30 defines a hollow interior 60. The first portion 30c (also referred to as the front-section) of the front side member 30 extends in a rearward direction from the front end 30a of the front side member 30 in a vehicle longitudinal direction parallel to the longitudinal center line $C_L$. As shown in FIGS. 3 and 4, the front side member 30 has an outboard wall 62 and an inboard wall 64.

As shown in FIGS. 3 and 4, the outboard wall 62 defines an outboard opening 66 that extends through the outboard wall 62 and to the hollow interior 60. The inboard wall 64 of the front side member 30 defines an inboard opening 68 that extends through the inboard wall 64 and to the hollow interior 60. The outboard wall 62 at the outboard opening 66 and the inboard wall 64 at the inboard opening 68 defines an off-center impart structure attachment section 60a (hereinafter referred to as the attachment section 60a).

The outboard opening 66 and the inboard opening 68 are both located rearward of the body attachment structure 42. The body attachment structure 42 is attached to the outboard wall 62 of the front side member 30 along the front portion 32 (the front-section) rearward of the first outboard opening 66 via, for example, welding techniques.

Figure 8:
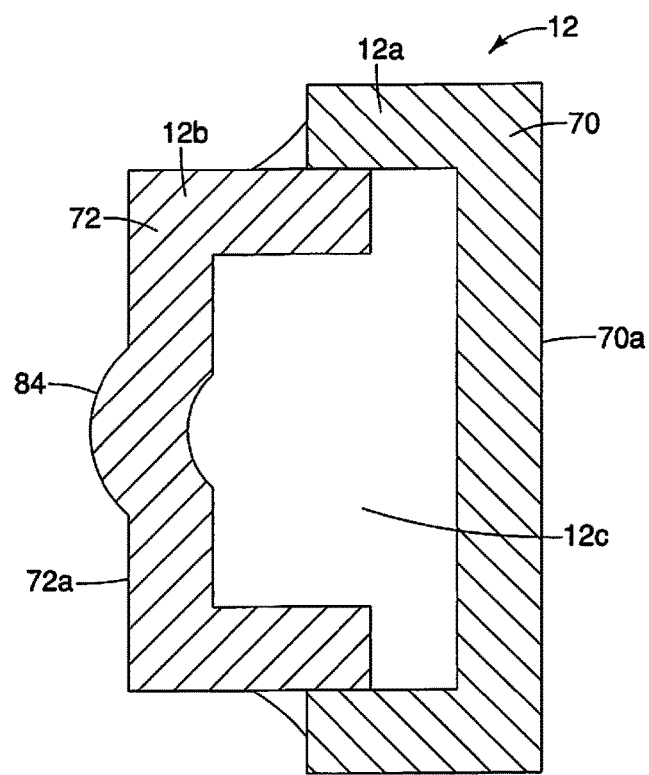
FIG. 8 is a cross-sectional side view of the off-center impact structure shown removed from the frame of the vehicle and showing details of the elongated rib of the rearward surface in accordance with the first embodiment.

In the depicted embodiments, the off-center impact structure 12 can be constructed from two separate metallic C-shaped beam portions shaped to conform to the overall shape depicted in FIGS. 3, 5, 6 and 8. Specifically, the off-center impact structure 12 includes a first part 21a that defines a forward-facing wall 70 and a second part 12b that defines a rearward facing wall 72. The first part 12a and the second part 12b are welded or otherwise rigidly fixed to one another as shown in FIG. 8, and define a hollow interior 12c therebetween, as shown in FIGS. 4 and 8. The off-center impact structure 12 basically defines a first end section 74, a mid-section 76 and a second end section 78.

The first end section 74 is oriented perpendicular to the longitudinal center line $C_L$ of the frame 14, as shown in FIGS. 2 and 3. The mid-section 76 extends laterally outward (in an outboard direction) and curves to further extend in a forward direction relative to the frame 14. The mid-section 76 further defines an arcuate shape curving forward from the first end section 74 to the second end section 76 such that the second end section 76 is located laterally outboard relative to the front side member 30. The second end section 78 of the off-center impact structure 12 is located forward of the attachment flanges 42 of the front side member 30. The mid-section 74 is described in greater detail below.

Figure 5:
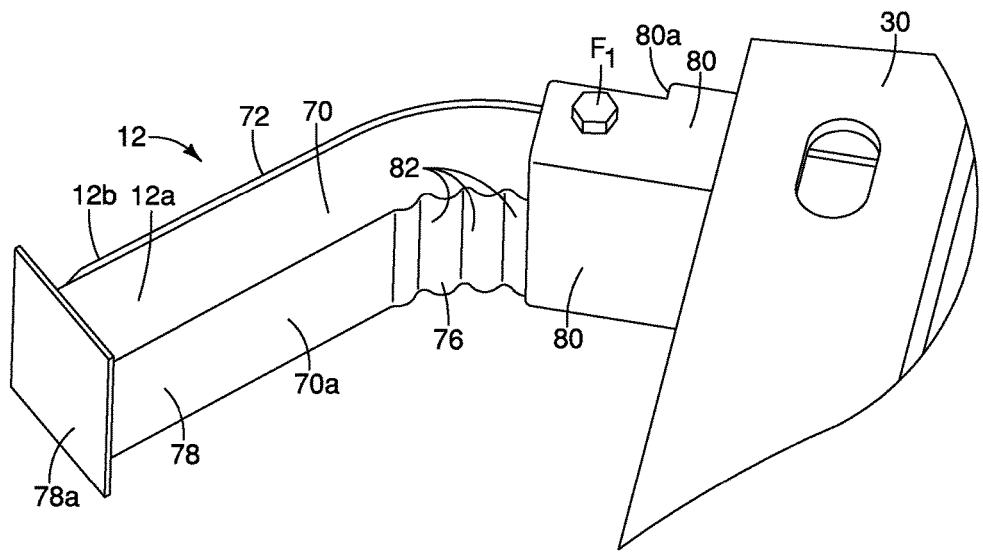
FIG. 5 is perspective front view of the off-center impact structure, a sleeve and a portion of the front side member in a non-impacted state in accordance with the first embodiment.
Figure 6:
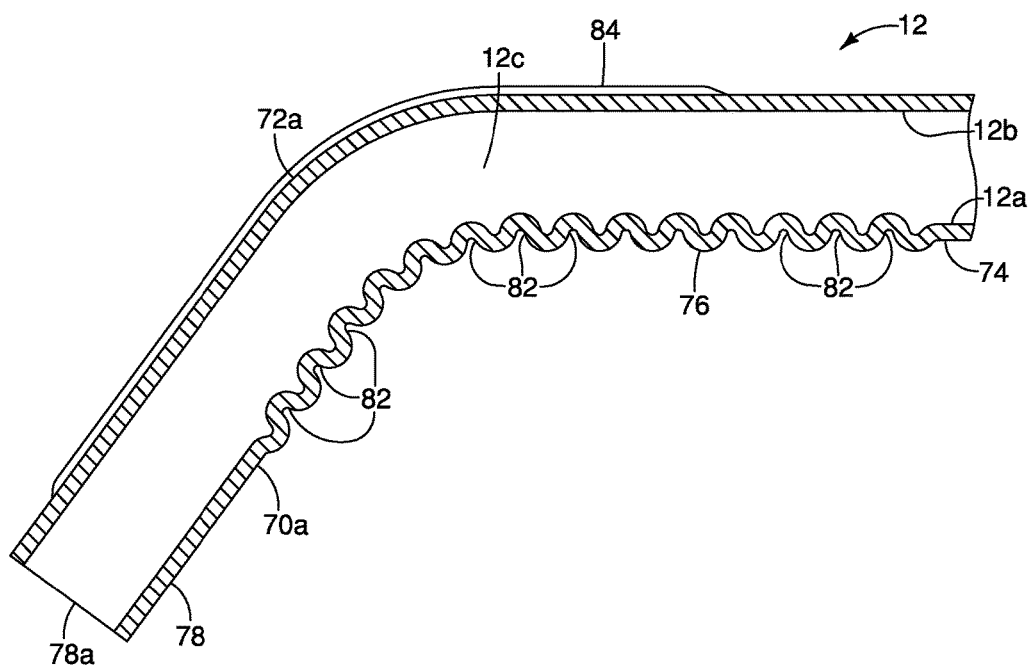
FIG. 6 is a cross-sectional top view of the off-center impact structure shown removed from the frame of the vehicle in the non-impacted orientation and showing details of a forward wall that includes a plurality of bellow-shaped recesses, and a rearward surface that includes an elongated rib in accordance with the first embodiment.
Figure 7:
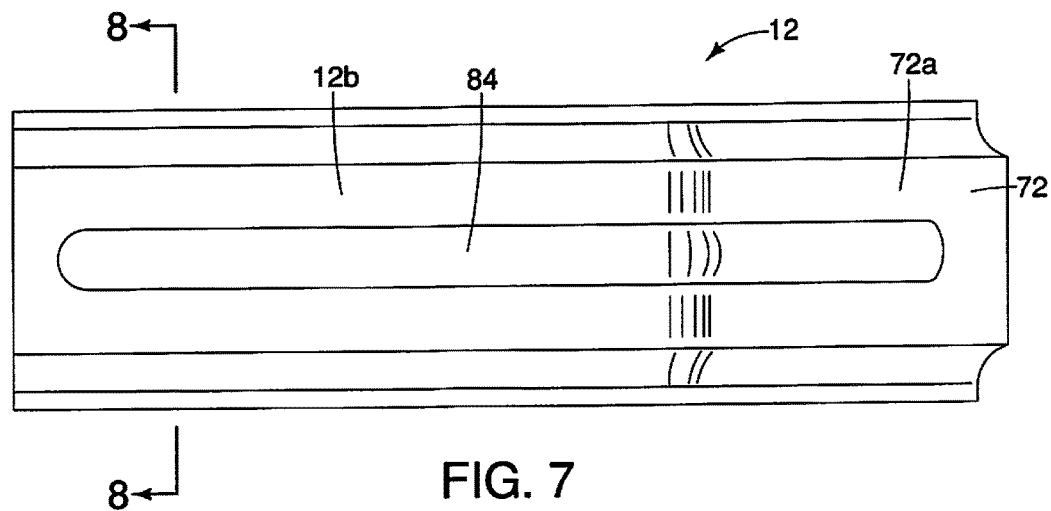
FIG. 7 is a rear view of the off-center impact structure shown removed from the frame of the vehicle in the non-impacted orientation showing details of the elongated rib in accordance with the first embodiment.

The first end section 74 is fixedly attached to the attachment section 60a of the front side member 30, as shown in FIGS. 2-5. Specifically, as shown in FIGS. 3, 4 and 5, the off-center impact structure 12 also includes a sleeve 80. The sleeve 80 is a hollow beam member with open ends that expose a hollow interior of the sleeve 80. The sleeve 80 attaches to the attachment section 60a of the front side member 30. Specifically, the sleeve 80 is inserted into the outboard opening 66 through the hollow interior 60 and to the inboard opening 68 of the front side member 30. The sleeve 80 basically defines a tunnel through the front side member 30. The sleeve 80, like the front side member 30, is preferably made of a metallic material such as steel and is fixedly attached to the outboard wall 62 and the inboard wall 64. For example, the sleeve 80 can be welded to the outboard wall 62 and welded to the inboard wall 64, but can alternatively be attached to the front side member 30 via mechanical fasteners.

The second end section 78 of the off-center impact structure 12 is inserted into the sleeve 80. A fastener $F_1$ is inserted through apertures in the sleeve 80 and first end section 74 of the off-center impact structure 12. The fastener $F_1$ retains the first end section 74 of the off-center impact structure 12 in place within the sleeve 80 and consequently to the front side member 30.

The attachment between the first end section 74 of the off-center impact structure 12 and the sleeve 80 via the fastener $F_1$ can be calibrated or attenuated such that first end section 74 of the off-center impact structure 12 can optionally be released from the sleeve 80 in response to a predetermined impact energy level. In other words, during an impact event, the fastener $F_1$ fixing the elongated member 74 in place to the sleeve 80 can configured to release the elongated member 74 from the sleeve 80 upon application of force above a predetermined force level. Conversely, during an impact event, the fastener $F_1$ holding or fixing first end section 74 of the off-center impact structure 12 in place to the sleeve 80 can configured to retain first end section 74 of the off-center impact structure 12 to the sleeve 80 upon application of force lower than the predetermined force level.

Along the forward-facing wall 70 of the off-center impact structure 12, the mid-section 74 has a forward-facing surface 70a formed with a plurality of vertically oriented recesses 82. The plurality of vertically oriented recesses 82 along the forward-facing surface 70a are shaped and dimensioned such that in response to an off-center impact event where impacting force $I_F$ is applied to a distal end of the second end section 78, the off-center impact structure 12 deforms bending at the mid-section 76 with at least a portion of the vertically oriented recesses 82 expanding in a bellows-like manner absorbing portions of impact energy of the impacting force $I_F$ while at the second end section moves rearward as the mid-section 76 deforms, as shown in FIGS. 9-10 and 13-16.

Figure 12:
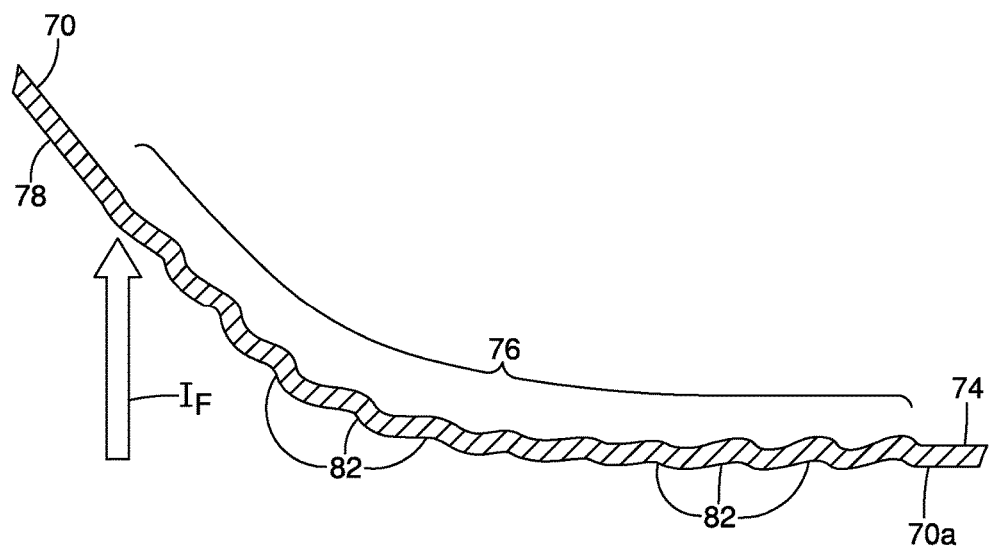
FIG. 12 is another cross-sectional view of the forward wall of the off-center impact structure showing the forward wall in a deformed orientation after absorbing the impact energy of an impact event with the plurality of bellow-shaped recesses being expanded in the impacted state in accordance with the first embodiment.
Figure 13:
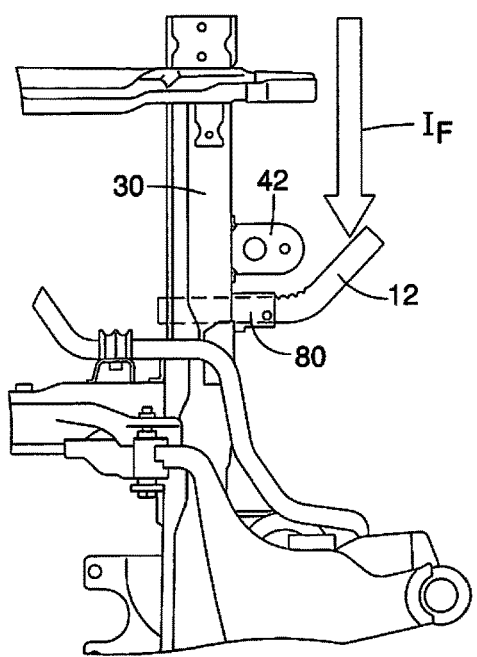
FIG. 13 is a bottom view (looking upward) of the frame of the vehicle showing the off-center impact structure in the non-impacted orientation must prior to an impact event where an impact force is about to deform the off-center impact structure in accordance with the first embodiment.

The rearward facing surface 72a of the second part 12b includes a rib 84 that extends a majority of the overall length of the off-center impact structure 12. The rib is oriented and dimensioned to provide rigidity to the off-center impact structure 12. The off-center impact structure 12 is configured such that in response to the impact forces $I_F$ engaging the distal end 78a of the second end section 78, the rib 84 of the second part 12b adds rigidity to the off-center impact structure 12. Specifically, the second part 12b of the off-center impact structure 12 exhibits a greater resistance to deformation than the first part 12a. Put another way, the recesses 82 are more likely to deform such that the forward-facing surface 70a is elongated during deformation than the second part 12b. As shown in FIG. 12, the first part 12a can straighten, then bend in a rearward direction absorbing Impacting force $I_F$, as is also shown in FIGS. 13-16.

During deformation of the forward-facing surface 70a, the rib 84 provides strength and rigidity to the second part 12b and the rearward facing surface 72a. The second part 12b acts more as a fulcrum about which the first part 12a can bend (deform) absorbing impact energy. It should be understood from the drawings and the description herein that the second part 12b does undergo some deformation and absorbs impact energy $I_F$ as the off-center impact structure 12 deforms. It should further be understood that during the impact event, the first part 12a is under tension (and elongates) while the second part 12b is under compression. The rib 84 provides added resistance to deformation of the second part 12b as the second part 12b experiences increasing amounts of compression as the first part 12a deforms.

Figure 11:
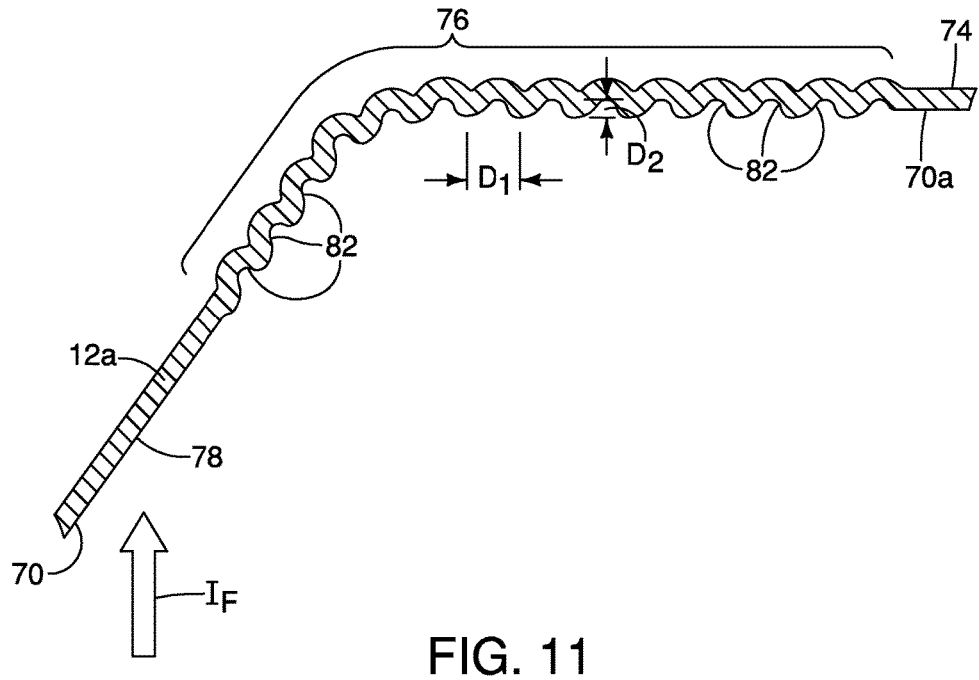
FIG. 11 is a cross-sectional view of the forward wall of the off-center impact structure showing the plurality of bellow-shaped recesses in the non-impacted state in accordance with the first embodiment.

FIG. 11 shows the mid-section 76 of the forward-facing wall 70 and the forward-facing surface 70 in a non-deformed state, prior to an impact event. As shown in FIG. 11, the recesses 82 resemble a sinusoidal wave. Further, each the recess 82 has an overall width indicated by a distance $D_1$. Further, each the recess 82 has an overall depth indicated by a distance $D_2$. When the mid-section 76 of the forward-facing wall 70 and the forward-facing surface 70 are deformed as a result of the impacting force $I_F$ of an impact event, the recesses 82 are opened up like a bellows of an accordion, as shown in FIG. 12. Specifically, the surface area of the recesses 82 is stretched out such that the recesses 82 begin to elongate, such that the width of each deformed recess increases to a distance much greater than the distance $D_1$. Simultaneously, as the recesses 82 are stretched or flattened out the depth of each recesses 82 decreases to a distance much less than the distance $D_2$.

The recesses 82, specifically, width represented by the distance $D_1$ and the depth represented by the distance $D_1$, can be modified. For example, if fewer recesses 82 are formed on the forward-facing surface 70a, then the overall depth represented by the distance $D_1$, is increased to ensure that the overall surface area of the forward-facing surface 70a, including the surfaces of each of the sinusoidal surfaces of the recesses 82, must be sufficient to allow the forward-facing surface 70a to deform and elongate, thereby absorbing maximum portions of the impacting force $I_F$ without fracturing or splitting apart. As well, the overall thickness of the forward-facing wall 70 and the rearward-facing wall 72 can be varied in order to attenuate the deformation response of the off-center impact structure 12. Specifically, the thicknesses of the forward-facing wall 70 and the rearward-facing wall 72 can be made the same, or one of the forward-facing wall 70 and the rearward-facing wall 72 can be thicker than the other in order to provide the deformation characteristics desired in response to predetermined amounts of impacting force $I_F$.

Figure 14:
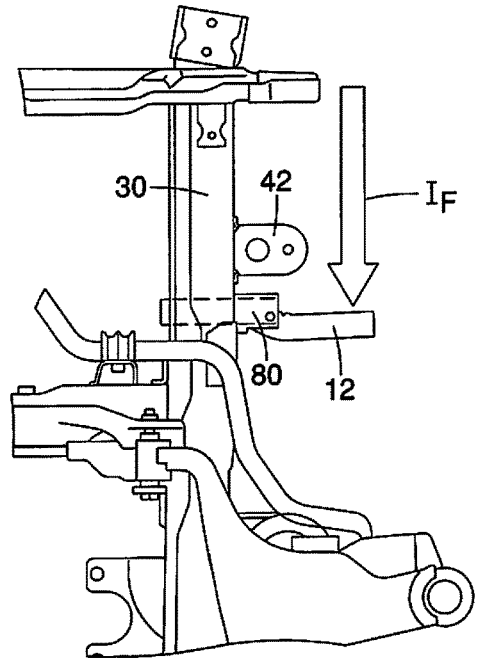
FIG. 14 is another bottom view of the frame of the vehicle showing the off-center impact structure in an intermediate impacted orientation after the beginning of the impact event where the impact force has partially deformed the off-center impact structure in accordance with the first embodiment.
Figure 15:
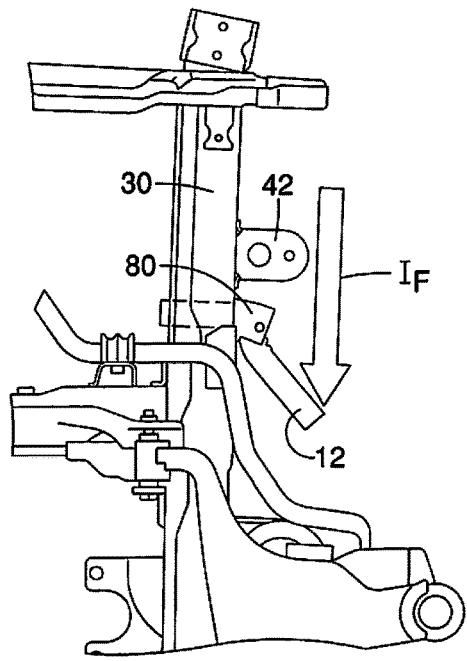
FIG. 15 is yet another bottom view of the frame of the vehicle showing the off-center impact structure in a further intermediate impacted orientation near the conclusion of the impact event where the impact force has deformed the off-center impact structure in accordance with the first embodiment.
Figure 16:
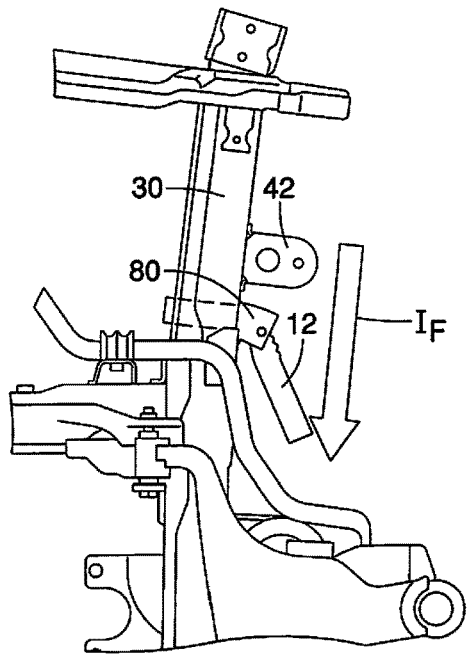
FIG. 16 is still another bottom view of the frame of the vehicle showing the off-center impact structure in the impacted orientation at the conclusion of the impact event where the impact force has fully deformed the off-center impact structure in accordance with the first embodiment.

FIGS. 13-16 show a sequence of deformation as the impacting force $I_F$ acts on the off-center impact structure 12. Specifically, FIG. 13 (a bottom view looking upward) shows the off-center impact structure 12 in the non-impacted orientation must prior to the impact event and the application of the impacting force $I_F$. FIG. 14 shows the off-center impact structure 12 in an intermediate impacted orientation after the beginning of the impact event where the impacting force $I_F$ has partially deformed the off-center impact structure. FIG. 15 shows the off-center impact structure 12 in a further intermediate impacted orientation near the conclusion of the impact event where the impacting force $I_F$ has deformed the off-center impact structure. FIG. 16 shows the off-center impact structure 12 in a fully impacted orientation at the conclusion of the impact event where the impacting force $I_F$ has fully deformed the off-center impact structure 12.

Figure 9:
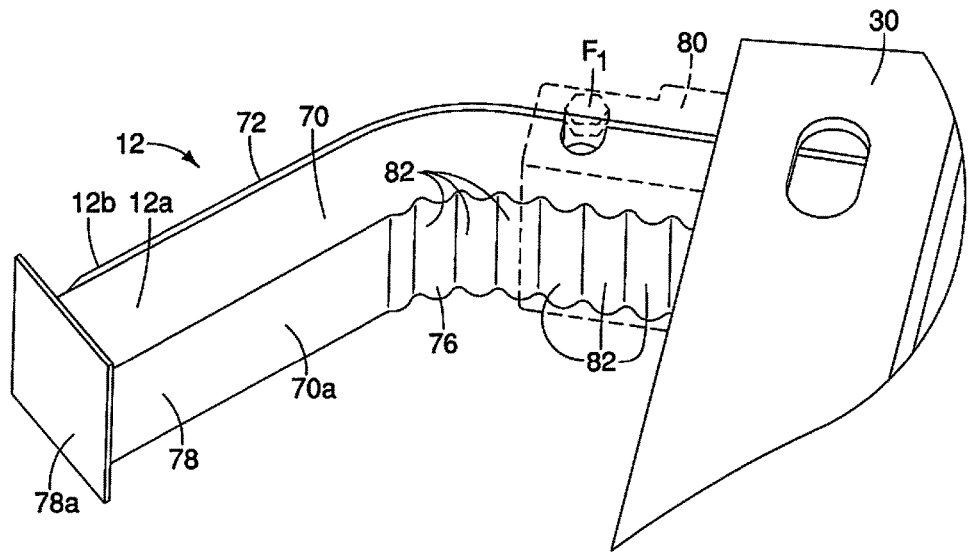
FIG. 9 is another perspective front view of the frame, the sleeve and the off-center impact structure similar to FIG. 5 showing the off-center impact structure in the non-impacted orientation in accordance with the first embodiment.
Figure 10:
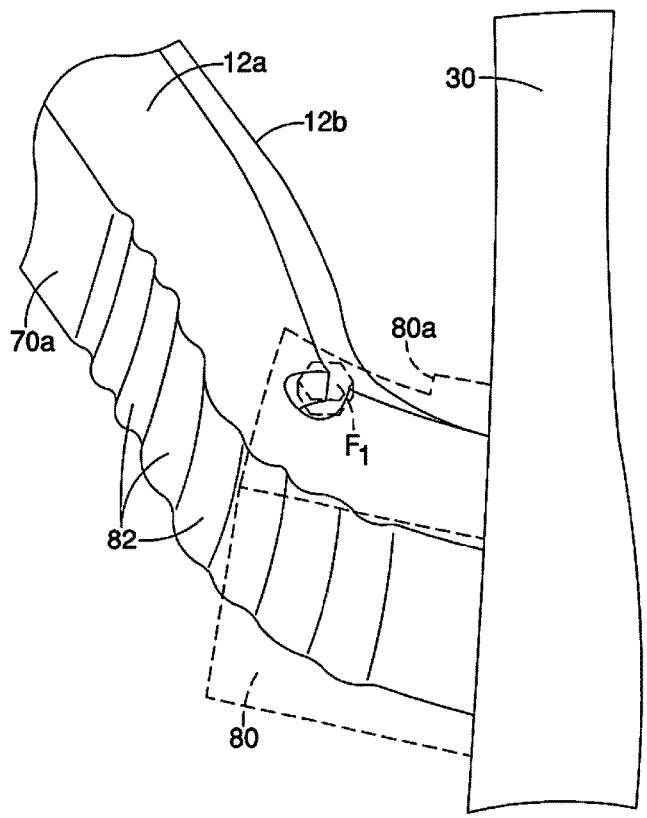
FIG. 10 is another perspective front view of the frame, the sleeve and the off-center impact structure similar to FIG. 9 showing the off-center impact structure in an impacted orientation after absorbing impact energy of an impact event in accordance with the first embodiment.

As shown in FIGS. 5 and 9, the sleeve 80 can optionally be formed with a recessed area 80a at an end portion thereof located outboard of the outboard wall 62 of the front side member 30. The recessed area 80a is located along a rearward side of the sleeve 80 such that during the off-center impact event the mid-section 76 of the off-center impact structure 12 is allowed to deform in the vicinity of the recessed area 80a of the sleeve 80.

The vehicle body structure 15 and elements of the frame 14 (other than the off-center impact structure 12) are conventional components that are well known in the art. Since these elements and structures are well known in the art, these structures will not be discussed or illustrated in detail herein. Rather, it will be apparent to those skilled in the art from this disclosure that the components can be any type of structure and/or programming that can be used to carry out the present invention.

Second Embodiment

Figure 17:
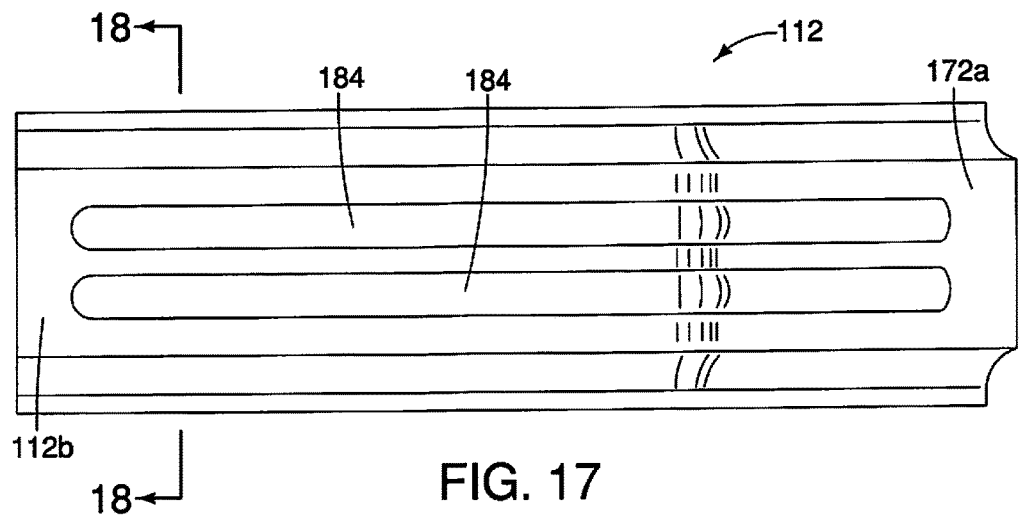
FIG. 17 is a rear view of an off-center impact structure shown removed from the frame of the vehicle in a non-impacted orientation showing details of elongated ribs in accordance with a second embodiment.
Figure 18:
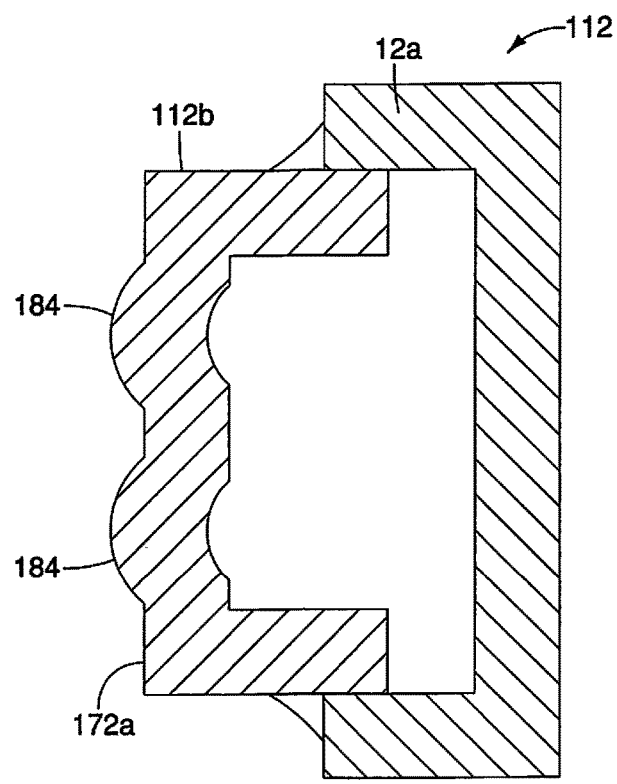
FIG. 18 is a cross-sectional side view of the off-center impact structure depicted in FIG. 17 showing details of the elongated ribs of the rearward surface in accordance with the second embodiment.

Referring now to FIGS. 17 and 18, an off-center impact structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The off-center impact structure 112 is identical to the off-center impact structure 12 of the first embodiment, except that the second part 12b is replaced with a second part 112b. The rearward facing surface 172a of the second part 112b includes two ribs 184 that replace the single rib 84 of the first embodiment.

Third Embodiment

Figure 19:
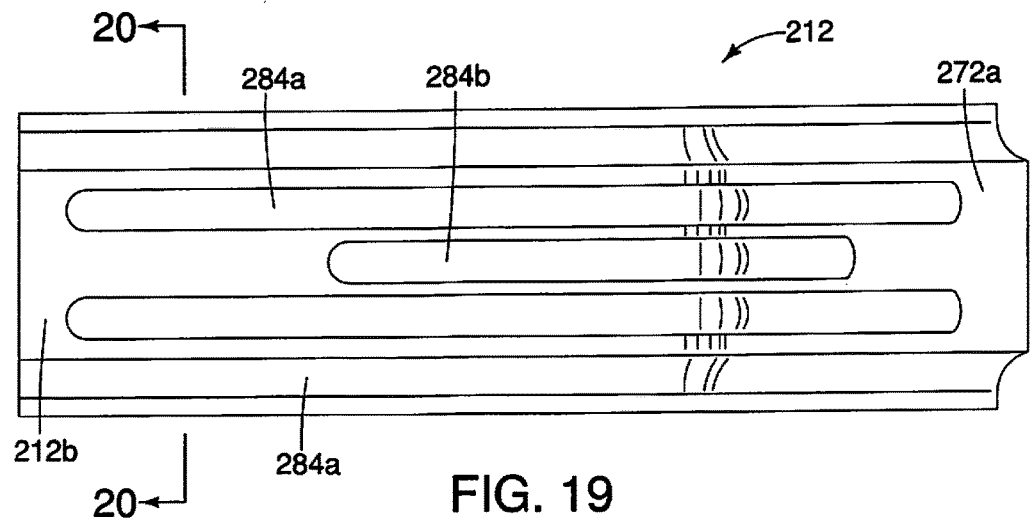
FIG. 19 is a rear view of an off-center impact structure shown removed from the frame of the vehicle in a non-impacted orientation showing details of elongated ribs in accordance with a third embodiment.
Figure 20:
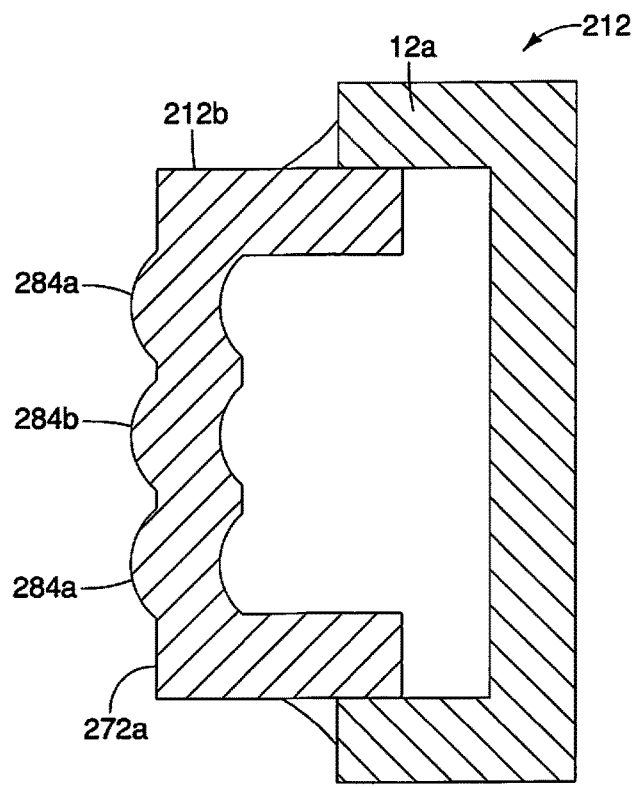
FIG. 20 is a cross-sectional side view of the off-center impact structure depicted in FIG. 19 showing details of the elongated ribs of the rearward surface in accordance with the third embodiment.

Referring now to FIGS. 19 and 20, an off-center impact structure 212 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The off-center impact structure 212 is identical to the off-center impact structure 12 of the first embodiment, except that the second part 12b is replaced with a second part 212b. The rearward facing surface 272a of the second part 212b includes two parallel ribs 284a and a third rib 284b located between the two ribs 284a. Further, the third rib 284b is shorter than the two ribs 284a. However it should be understood from the drawings and the description herein that the two ribs 284a can alternatively be made shorter than the third rib 284b in order to further attenuate the response to the impacting force $I_F$.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device that includes mechanical structures that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A frame protrusion rupture mitigating structure comprising:
    a front side member having a front end and a front-section extending rearward from the front end in a vehicle longitudinal direction, the front-section defining an attachment section and a suspension support section rearward of the attachment section; and
    an off-center impact structure having a first end section, a mid-section and a second end section, the first end section being fixedly attached to the attachment section of the front side member, the mid-section extending laterally outward and defining an arcuate shape curving forward from the first end section and to the second end section laterally outboard relative to the front side member, the second end section of the off-center impact structure being located forward of the attachment section of the front side member, the mid-section having a forward-facing surface formed with a plurality of vertically oriented recesses such that in response to an off-center impact event where impacting force is applied to a distal end of the second end section, the off-center impact structure deforms bending at the mid-section with at least a portion of the vertically oriented recesses expanding in a bellows-like manner absorbing impact energy with at the second end section moving rearward.

2. The frame protrusion rupture mitigating structure according to claim 1, wherein
    the off-center impact structure includes a first portion and a second portion welded to one another defining a hollow interior there between.

3. The frame protrusion rupture mitigating structure according to claim 2, wherein
    the first portion and the second portion extend an overall length of the off-center impact structure with the first portion defining the forward surface of the off-center impact structure and the second portion defining a rearward facing surface of the off-center impact structure.

4. The frame protrusion rupture mitigating structure according to claim 3, wherein
    the rearward facing surface of the second portion includes a rib that extends a majority of the overall length of the off-center impact structure, the rib being oriented and dimensioned to provide rigidity to the off-center impact structure.

5. The frame protrusion rupture mitigating structure according to claim 4, wherein
    the off-center impact structure is configured such that in response to the off-center impact event the rib of the second portion absorbs impact energy as the off-center impact structure deforms.

6. The frame protrusion rupture mitigating structure according to claim 1, wherein
    the first end section of the off-center impact structure extends in a direction that is perpendicular to the front side member.

7. The frame protrusion rupture mitigating structure according to claim 1, wherein
    the attachment section of the front side member includes a hollow interior, the front side member having an outboard wall and an inboard wall with an outboard opening extending through the outboard wall to the hollow interior, with the first end section of the off-center impact structure extending through the outboard opening and into the hollow interior.

8. The frame protrusion rupture mitigating structure according to claim 7, wherein
    the attachment section of the front side is further defined by an inboard opening in the inboard wall of the front side member, with the first end section of the off-center impact structure extending through the inboard opening.

9. The frame protrusion rupture mitigating structure according to claim 8, further comprising
    a sleeve extending through the outboard opening, the hollow interior and through the inboard opening of the front side member, the sleeve being fixedly attached to the outboard wall and the inboard wall with the first end portion of the off-center impact structure extending into the sleeve, the first end portion of the off-center impact structure being directly attached to the sleeve.

10. The frame protrusion rupture mitigating structure according to claim 9, wherein
    the sleeve is welded to the outboard wall and welded to the inboard wall.

11. The frame protrusion rupture mitigating structure according to claim 9, wherein
    the first end portion of the off-center impact structure is directly attached to the sleeve via a removable fastener.

12. The frame protrusion rupture mitigating structure according to claim 9, wherein the sleeve includes an end portion located outboard of the outboard wall of the front side member, the end portion having a recessed area along a rearward side of the sleeve such that during an off-center impact event the mid-section of the off-center impact structure deforms in the vicinity of the recessed area of the sleeve.

13. The frame protrusion rupture mitigating structure according to claim 12, wherein
the recessed area of the end portion of the sleeve includes a curved surface located such that during an off-center impact test the mid-section of the off-center impact structure deforms in the vicinity of curved surface of the recessed area of the sleeve.

14. The frame protrusion rupture mitigating structure according to claim 1, wherein
the front side member includes a cab mount flange fixedly attached to an outboard surface of the front side member forward of the attachment section, the cab mount flange extending in the outboard direction.

15. The frame protrusion rupture mitigating structure according to claim 14, wherein
the second section of the off-center impact structure has a distal end located forward of the cab mount flange with the off-center impact structure being in a non-impacted state.

16. The frame protrusion rupture mitigating structure according to claim 14, further comprising
a front wheel suspension structure supported to the suspension support section of the front side member rearward of the attachment section and the cab mount flange, and extending in an outboard direction from the front side member.

17. The frame protrusion rupture mitigating structure according to claim 1, further comprising
a front wheel suspension structure supported to the suspension support section of the front side member rearward of the attachment section, and extending in an outboard direction from the front side member.

* * * * *